United States Patent
Underwood et al.

(10) Patent No.: US 8,842,592 B2
(45) Date of Patent: *Sep. 23, 2014

(54) SYSTEM AND METHOD FOR REGISTRATION OF A NETWORK ACCESS DEVICE DURING LOSS OF POWER

(75) Inventors: Rosa M. Underwood, Washington, DC (US); Armin Raoufinia, McLean, VA (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/527,818

(22) Filed: Jun. 20, 2012

(65) Prior Publication Data

US 2012/0266017 A1    Oct. 18, 2012

Related U.S. Application Data

(63) Continuation of application No. 12/235,843, filed on Sep. 23, 2008, now Pat. No. 8,223,679.

(51) Int. Cl.
| | | |
|---|---|---|
| G08C 17/00 | (2006.01) | |
| H04L 29/14 | (2006.01) | |
| H04L 29/06 | (2006.01) | |
| G06F 1/30 | (2006.01) | |
| H04L 12/28 | (2006.01) | |

(52) U.S. Cl.
CPC ......... *H04L 65/1073* (2013.01); *H04L 12/2885* (2013.01); *H04L 69/40* (2013.01); *G06F 1/305* (2013.01)
USPC ............................ 370/311; 370/402; 455/574

(58) Field of Classification Search
CPC ....................................................... G06F 11/20
USPC ......... 370/216–228, 242–245, 311, 318–327, 370/466–469; 455/572–574, 343.1–343.6
See application file for complete search history.

(56) References Cited

U.S. PATENT DOCUMENTS

| | | |
|---|---|---|
| 4,792,946 A | 12/1988 | Mayo |
| 6,366,774 B1 | 4/2002 | Ketonen et al. |
| 6,687,748 B1 | 2/2004 | Zhang et al. |
| 6,697,372 B1 * | 2/2004 | McAlear ....................... 370/402 |
| 6,721,580 B1 | 4/2004 | Moon |
| 7,336,978 B2 | 2/2008 | Kim |
| 2003/0182496 A1 | 9/2003 | Yoo |
| 2004/0180653 A1 | 9/2004 | Royalty |
| 2004/0213286 A1 | 10/2004 | Jette et al. |
| 2005/0180317 A1 * | 8/2005 | Shimada ....................... 370/217 |
| 2008/0159232 A1 | 7/2008 | Thalanany et al. |

* cited by examiner

*Primary Examiner* — Ricky Ngo
*Assistant Examiner* — Iqbal Zaidi

(57) ABSTRACT

A system and method for registration of a network access device including a processor configured to identify power loss at a network access device, initiate backup power at the network access device, identify when the backup power at the network access device decreases to or below a first predetermined level, and identify when backup power at the network access device is restored to or above a second predetermined level, and a transmitter configured to transmit, to a server, a registration extension message to reconfigure conditions for handling inbound communications and a registration extension cancellation message to restore original conditions for handling inbound communications.

24 Claims, 7 Drawing Sheets

SYSTEM AND METHOD FOR REGISTRATION OF A NETWORK ACCESS DEVICE DURING LOSS OF POWER

CROSS REFERENCE TO RELATED APPLICATIONS

This application is a continuation of U.S. patent application Ser. No. 12/235,843, filed on Sep. 23, 2008, which is hereby incorporated by reference in its entirety.

BACKGROUND INFORMATION

Broadband communications is becoming more and more accessible to consumers. For example, consumers may now subscribe to telephone, Internet, digital multimedia, and/or other related services from one provider/connection using a network access device installed at the consumer's own premises. However, in the event of a power outage, broadband connection at the network access device may be lost. Subsequent outbound communications may not be made and inbound communications may receive a busy tone even if an automated service, such as voicemail, is programmed to the network access device. Current systems lack a technique to comprehensively and effectively provide network access device response during power loss and/or other similar circumstances.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for registration of a network access device during power loss. That is, exemplary embodiments may, among other things, expand and optimize communications between a network access device (e.g., an optical network terminal (ONT)) and other network components (e.g., a gateway, application server, etc.) in the event of power loss, power diminishment, or other similar circumstances.

Figure 1:
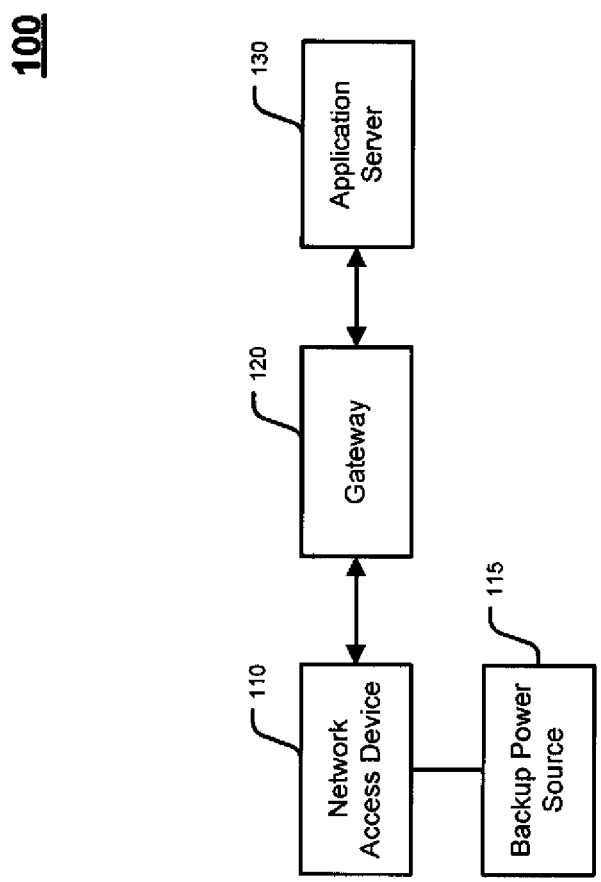
FIG. 1 depicts a block diagram of a system architecture for registration of a network access device during power loss, according to an exemplary embodiment.

FIG. 1 depicts a block diagram of a system architecture for registration of a network access device during power loss, according to an exemplary embodiment. It should be appreciated that system 100 is a simplified view for registration of a network access device during power loss and may include additional elements that are not depicted. As illustrated, the system 100 may include a network access device 110, a gateway 120, and an application server 130. The network access device 110 may be communicatively coupled to the gateway 120, which in turn may be communicatively coupled to the application server 130. In one or more embodiments, the network access device 110 may be directly communicatively coupled to the application server 130. Here, the gateway 120 may be optional, depending on preferences and/or requirements of a service provider.

The network access device 110 may be an optical network terminal (ONT) and/or other similar device. For example, in a passive optical network (PON), the PON may include an optical line terminal (OLT) at a service provider's central office, one or more ONTs near end users, and an optical distribution network (ODN) that includes optical fibers/splitters between the OLT and ONTs. For instance, it should be appreciated that an ONT may provide broadband service to a single family home/dwelling or a multi-dwelling unit (MDU), such as an apartment building or condominium (e.g., an MDU ONT). Such a network may improve bandwidth by reducing the among of fiber and central office equipment compared to point-to-point architectures. The network access device may also include backup power 115, such as a battery unit. The network access device 110 may also have a receiver, a transmitter, and/or a processor. In one embodiment, the processor of the network access device 110 may be configured to identify power loss at the network device as well as determine capacity at the backup power 115. It should be appreciated that receiver, transmitter, processor, and/or the backup power of the network access device may be integrated with the network access device 110, independent of the network access device 110, or a combination thereof.

The gateway 120 may be a session border controller (SBC) or other gateway. For example, an SBC may be a device used in VoIP networks to exert control over the signaling and/or media streams involved in setting up, conducting, or dismissing communications. Each communication session may include one or more call signaling streams that control the session, and one or more session media streams which carry the session's audio, video, and/or other data associated with how that data is flowing across the network. It should be appreciated that these streams may form a session where the SBC may manage the transfer of data streams of one or more sessions. It should also be appreciated that the gateway 120 may also provide a point of demarcation between one part of a network and another (e.g., firewall, etc.). As a result, by maintaining controlled sessions, an SBC may provide added security needs to a local network for various data, such as filtering routers or other network elements are used to control the flow of data streams, etc. In addition, the gateway 120 may provide measurement, access control, and/or data conversion.

The application server 130 may be a function component that provides communication-related features. For instance, in VoIP networks, these may include call forwarding, call waiting, and/or last call return, etc. Other various feature may also be realized. In one embodiment, the application server 130 may be a softswitch or other similar device/server. In this example, a softswitch, in a VoIP network, may connects telephone calls from one phone line to another, entirely by means of software running on a computer or server. Here, the application server 130 may be used to control connections at the junction point between circuit and packet networks. It should be appreciated that while the application server 130 may be communicatively coupled to a user agent and/or media gateway, a single device containing both the switching logic and the switching fabric may also be used for similar purposes. It should also be appreciated that the application server 130 may be a vendor-side. However, the application server 130 may be situated closer end users (e.g., subscriber-side) in the event larger network access devices are utilized.

It should be appreciated that each of the components of system 100 may be configured to receive, transmit, and/or process signals/data.

For example, the network access device 110 may also have one or more receivers, one or more transmitters, and/or one or more processors. For example, the network access device 110 may use these components to receive, process, and/or transmit data, which may be communicated to/from the one or more network components of system 100 (e.g., the gateway 120, application server 130, etc.). Communications may be achieved via transmission of electric, electromagnetic, optical, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, etc., or via protocols for a wired connection, such as an IEEE Ethernet 802.3.

It should be appreciated that communications between network components of system 100 may be conducted over any network (not shown), such as a local area network (LAN), a wide area network (WAN), a service provider network, the Internet, or other similar network. It should be appreciated that the network may use electric, electromagnetic, and/or optical signals that carry digital data streams.

It should also be appreciated that the devices and/or components of system 100 may be used independently or may be used as an integrated component in another device and/or system. It should also be appreciated that the devices and/or components of system 100 are shown as separate components, these may be combined into greater or lesser components to optimize flexibility. Other various embodiments may also be realized.

While depicted as network components, servers, platforms, and/or devices of the system 100, it should be appreciated that embodiments may be constructed in software and/or hardware, as separate and/or stand-alone, or as part of an integrated transmission and/or switching device/networks. For example, it should also be appreciated that the one or more network components, servers, platforms, and/or devices of the system 100 may not be limited to physical components. These components may be software-based, virtual, etc. Moreover, the various components, servers, and/or devices may be customized to perform one or more additional features and functionalities. Also, although depicted as singular network or system components, each of the various networks or system components may be equal, greater, or lesser.

Additionally, it should also be appreciated that system support and updating of the various components of the system 100 may be easily achieved. For example, an administrator may have access to one or more of these networks or system components. Such features and functionalities may be provided via deployment, transmitting and/or installing software/hardware.

It should also be appreciated that each of the networks or system components may include one or more processors, servers, modules, and/or devices for optimizing registration. It should be appreciated that one or more data storage systems (e.g., databases) (not shown) may also be coupled to each of the one or more processors, servers, modules, and/or devices of the system 100 to store relevant information for each of the servers and system components. Other various embodiments may also be provided. The contents of any of these one or more data storage systems may be combined into fewer or greater number of data storage systems and may be stored on one or more data storage systems and/or servers. Furthermore, the data storage systems may be local, remote, or a combination thereof to clients systems, servers, and/or other system components. In another embodiment, information stored in the databases may be useful in providing additional customizations for optimizing registration implementation.

According to one particular embodiment, the network access device 110 may also have a user agent that provides successful broadband connection with other network components. For instance, in Voice over Internet Protocol (VoIP), the network access device 110 may have a user agent that provides a dial tone (or other broadband connection) upon successful registration with an application server 130. In this example, the user agent may register the network access device 110 with the application server 130 at predetermined registration intervals. The network access device 110 may remain registered with the application server 130 as long as registration messages are sent and receive the registration messages at these predetermined intervals.

It should be appreciated that the frequency in which registration messages may be sent by the user agent may depend upon parameters provisioned in the user agent and/or the gateway 120 (e.g., the session border controller (SBC)), which may be situated between the user agent and the application server 130.

As described above, in the event of a power outage, broadband communication (e.g., dial tone) at the network access device 110 may be lost because the user agent is unable to successfully transmit a registration message within the predetermined registration interval. In one embodiment, the predetermined registration interval may be three (3) minutes. Other various intervals may be realized. Once the predetermined registration interval expires and the application server 130 has not yet received a registration message from the user agent at the network access device 110, the network access device 110 may no longer remain registered. As a result, the application server 130 may handle communications directed to/from the network access device 110 differently. For instance, when the network access device 110 is no longer registered, subsequent outbound communications (e.g., an outbound telephone call) may not be made and inbound communications (e.g., inbound telephone calls) may receive a busy tone even if an automated service, such as voicemail, is programmed to the network access device 110.

Figure 2:
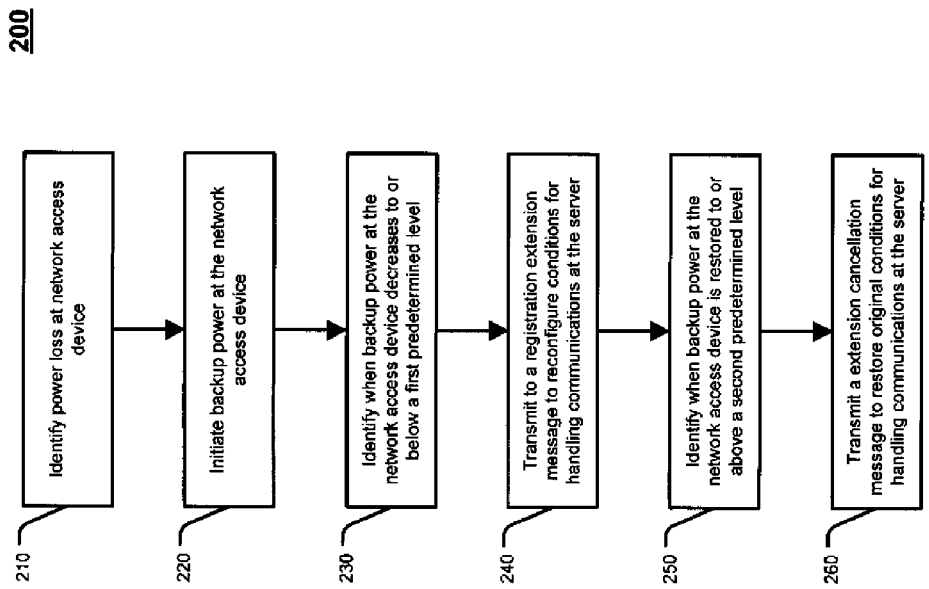
FIG. 2 depicts a flowchart of a method for registration of a network access device during power loss at a network access device, according to an exemplary embodiment.

FIG. 2 depicts a flowchart of a method for registration of a network access device during power loss, according to an exemplary embodiment. The exemplary method 200 is provided by way of example, as there are a variety of ways to carry out methods disclosed herein. The method 200 shown in FIG. 2 may be executed or otherwise performed by one or a combination of various systems. The method 200 is described below as carried out by at least system 100 in FIG. 1, by way of example, and various elements of systems 100 are referenced in explaining the example method of FIG. 2. Each block shown in FIG. 2 represents one or more processes, methods, or subroutines carried in the exemplary method 200. A computer readable medium comprising code to perform the acts of the method 200 may also be provided. Referring to FIG. 2, the exemplary method 200 may begin at block 210.

At block 210, power loss is identified. For example, a processor at the network access device 110 may be configured to identify power loss at the network access device 110. The processor may be communicatively coupled to the power source (e.g., alternating current (AC)/direct current (DC)) of the network access device 110. Accordingly, the processor may identify and determine when power is lost at the network access device 110.

At block 220, backup power is initiated. For example, the processor at the network access device 110 may be configured to initiate backup power once it is determined that there is a power outage at the network access device 110. The backup power may include an alternative power supply to the network access device 110, such as a battery backup unit. The battery backup unit may be useful in powering the network access device 110 for several hours. However, if a power outage at the network access device 110 is longer than the amount of time the battery unit is capable of powering the network access device 110, the network access device 110 may not remain registered with the application server 130.

Accordingly, at block 230, decrease in backup power may be identified. For example, the processor at the network access device 110 may be configured to identify when the backup power at the network access device 110 has decreased to or below a first predetermined level. In this example, the first predetermined level may be 10% capacity. At 10% capacity or other similar capacity, the network access device may have sufficient power to communicate with other network components before it shuts down. Other various capacity embodiments for tracking capacity may also be provided, such as capacity based on time remaining, etc.

At block 240, a registration extension message may be transmitted. For example, a transmitter at the network access device 110 may transmit to the application server 130 a registration extension message to reconfigure conditions, at the application server 130, for handling communications directed to the network access device 110. It should be appreciated that one or more registration extension messages may be transmitted at a predetermined interval as well, similar to that of the registration messages. It should be appreciated that the reconfigured conditions for handling inbound communications may include forwarding the inbound communications to an automated service. The automated service may be voicemail service, an announcement/alert, or a combination thereof.

At block 250, restoration of backup power may be identified. For example, the processor at the network access device 110 may be configured to identify when the backup power at the network access device 110 has been restored to or above a second predetermined level. In this example, the second predetermined level may be 10% capacity. Other various capacity embodiments for tracking capacity may also be provided, such as capacity based on time remaining, etc.

At block 260, a registration extension cancellation message may be transmitted. For example, a transmitter at the network access device 110 may transmit to the application server 130 a registration extension cancellation message to restore original conditions, at the application server 130, for handling communications directed to the network access device 110.

Figure 3:
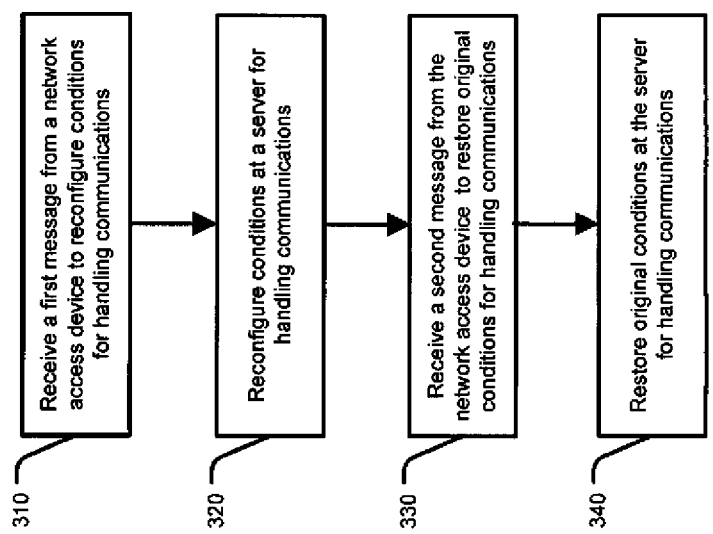
FIG. 3 depicts a flowchart of a method for registration of a network access device during power loss at a server, according to an exemplary embodiment.

FIG. 3 depicts a flowchart of a method for registration of a network access device during power loss, according to another exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by at least system 100 in FIG. 1, by way of example, and various elements of systems 100 are referenced in explaining the example method of FIG. 3. Each block shown in FIG. 3 represents one or more processes, methods, or subroutines carried in the exemplary method 300. A computer readable medium comprising code to perform the acts of the method 300 may also be provided. Referring to FIG. 3, the exemplary method 300 may begin at block 310.

At block 310, a registration extension message may be received. For example, a receiver at the application server 130 may be configured to receive a registration extension message from the network access device 110 to reconfigure conditions, at the application server 130, for handling inbound communications directed to the network access device 110. It should be appreciated that one or more registration extension messages may be received at a predetermined interval, similar to that of the registration messages.

At block 320, conditions for handling communications may be reconfigured. For example, a processor at the application server 130 may be configured to reconfigure conditions, at the application server 130, for handling inbound communications directed to the network access device 110. It should be appreciated that the reconfigured conditions for handling inbound communications may include forwarding the inbound communications to an automated service. The automated service may be voicemail service, an announcement/alert, or a combination thereof.

At block 330, a registration extension cancellation message may be received. For example, the receiver at the application server 130 may be configured to receive a registration extension cancellation message from the network access device 110 to restore original conditions, at the application server 130, for handling inbound communications directed to the network access device 110.

At block 340, original conditions for handling communications may be restored. For example the processor at the network access device 110 may be configured to restore original conditions, at the application server 130, for handling inbound communications directed to the network access device 110.

According to an exemplary embodiment, FIGS. 4A-4D depict SIP-based communications between an optical network terminal (ONT) 410, a session border controller (SBC) 420, and an application server (or softswitch) 430.

Figure 4A:
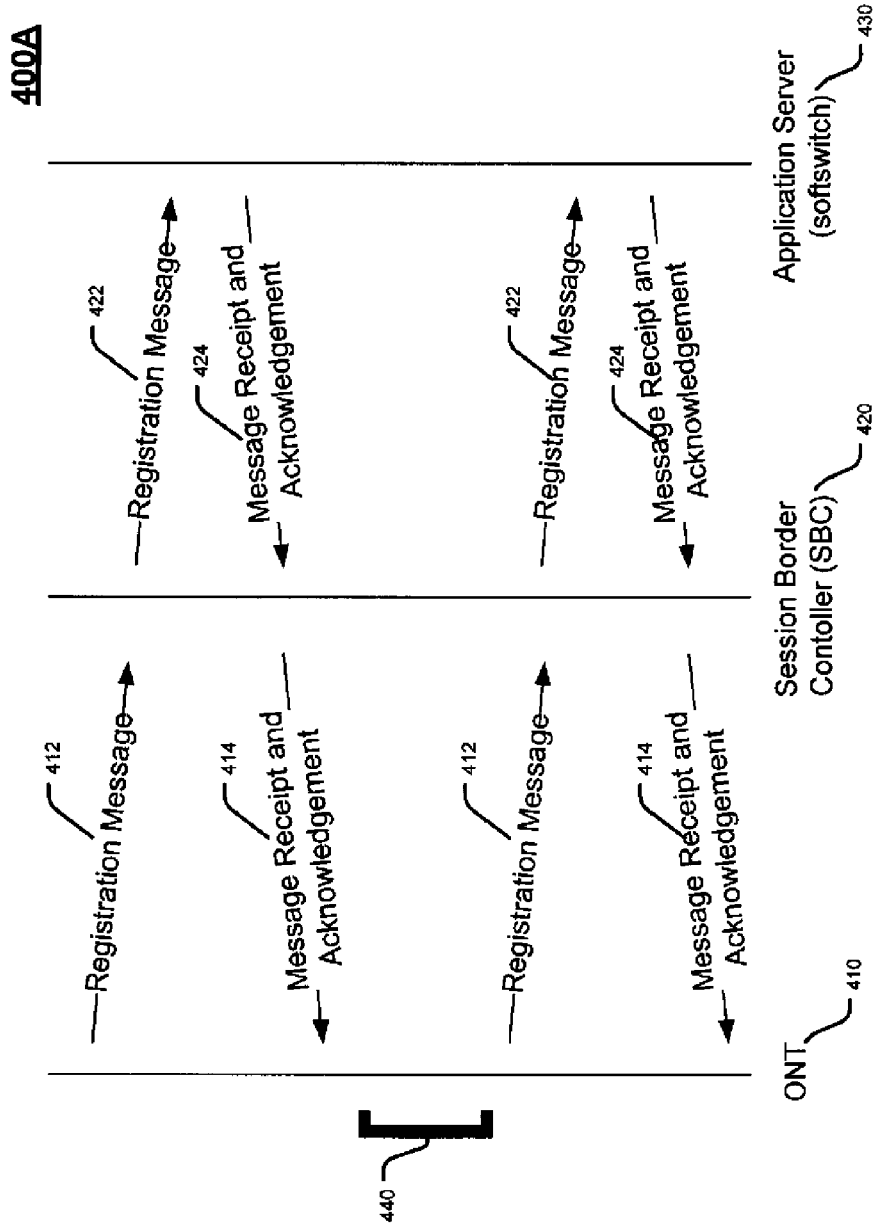
FIGS. 4A-4D depict SIP-based communications between a network access device and other network components, according to an exemplary embodiment.

In FIG. 4A, for example, the ONT 410 may transmit a registration message 412 to the SBC 420. The SBC 420 may then transmit a registration message 422 to the application server 430. As acknowledgement of receipt, the application server 430 may send a message receipt and acknowledgement 424 to the SBC 420. The SBC 430 may then transmit a message receipt and acknowledgement 414 to the ONT 410. Once the ONT 410 receives the message receipt and acknowledgement 414, the ONT will wait for a predetermined registration interval (e.g., three (3) minutes) before transmitting another registration message 412, thus beginning another message registration cycle. It should be appreciated that by continuously transmitting registration messages in this communication 400A, the application server 430 may be made aware that the ONT 410 is functioning properly and thereby treating inbound communications (e.g., telephone calls, etc.) under original conditions.

Figure 4B:
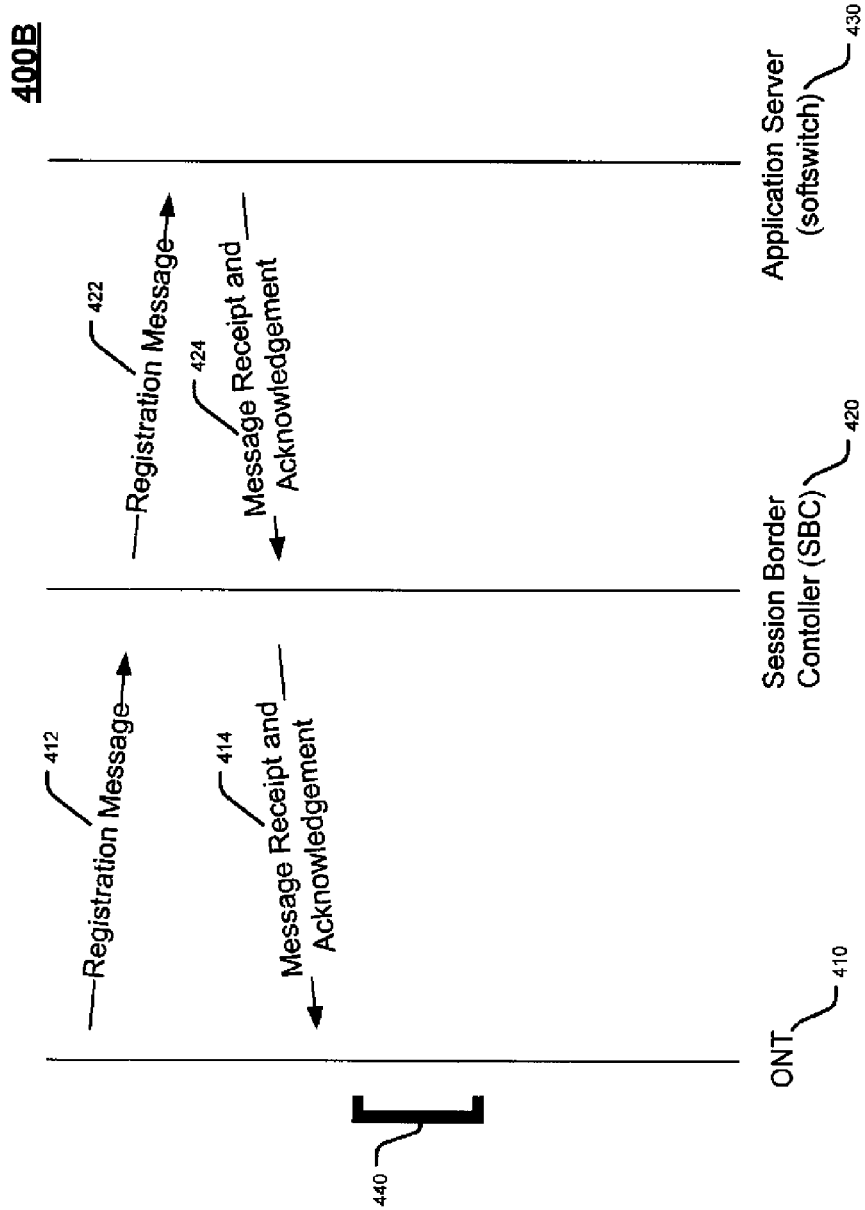

In FIG. 4B, for example, communications 400B may be severed when there is a power outage. For example, broadband communication (e.g., dial tone) at the ONT 410 may be lost because the user agent at the ONT 410 is unable to successfully transmit a registration message within the predetermined registration interval 440. Here, once the predetermined registration interval 410 expires and the application server 430 has not yet received a registration message 412 from the user agent at the network access device 410 via the SBC 420, the ONT 410 may no longer remain registered. As a result, the application server 430 may handle communications directed to/from the network access device 110 differently than if the ONT 410 remained registered. For instance, subsequent outbound communications (e.g., a outbound telephone call) may not be made and inbound communications (e.g., inbound telephone calls) may receive a busy tone even if an automated service, such as voicemail, is programmed at the ONT 410. In this example, concern may stir the hearts of inbound callers who receive a busy tone rather than a voicemail message.

Figure 4C:
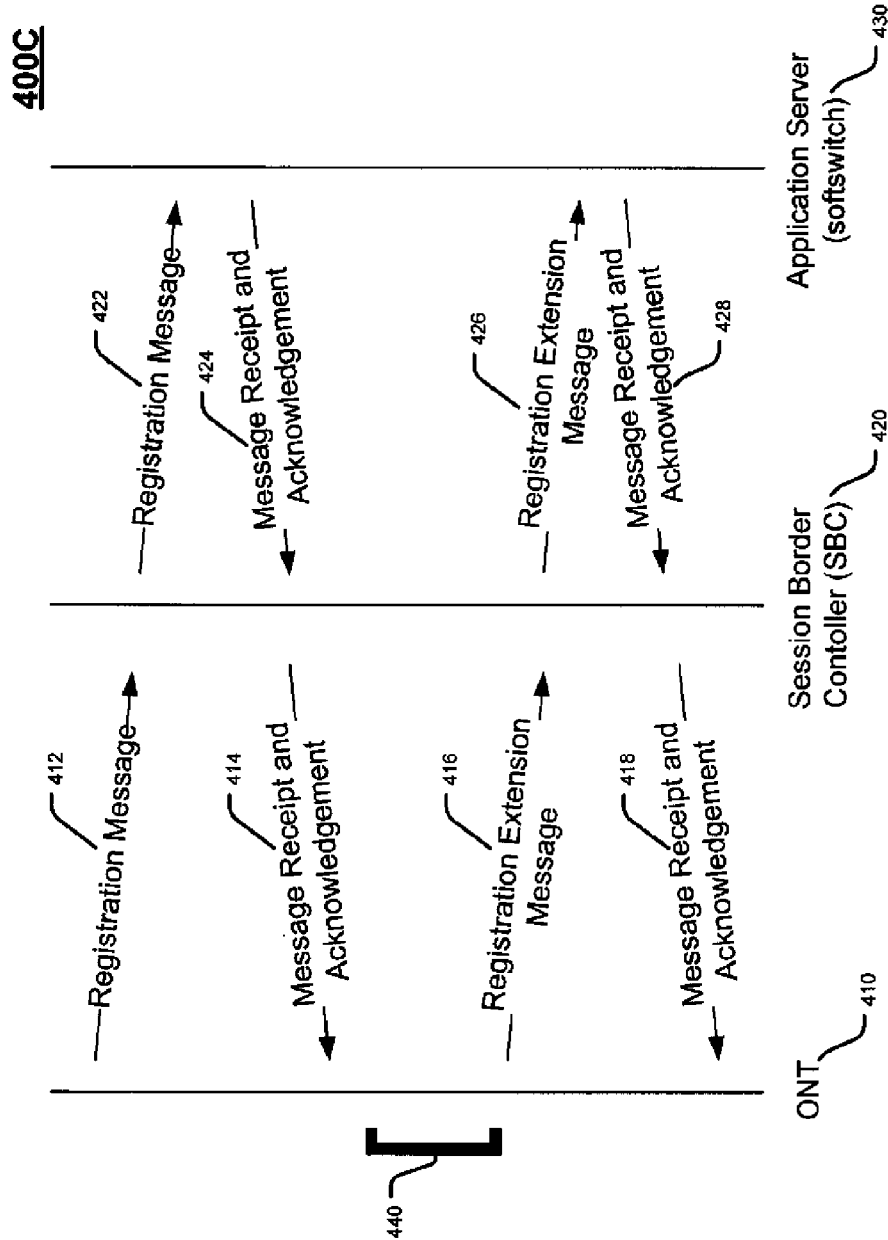

In FIG. 4C, communications 400C between network components may continue even upon loss of power to the ONT 410. For example, power is lost and a processor at the ONT 410 identifies such loss in power, backup power may be initiated. Here, the processor at the ONT 410 may monitor the backup power and when the backup power decreases to or below a predetermined level (e.g., 10%), the ONT 410 may transmit a registration extension message 416 to the SBC 420. The SBC 420 may then transmit a registration message 426 to the application server 430. The application server 430 may transmit a message receipt and acknowledgement 428 to the SBC 420. The SBC 420 may then transmit a message receipt and acknowledgement 418 to the ONT 410. In other words, when the backup power reaches a predetermined diminished level, the ONT 410 may send a "dying gas" to inform the other network components know that it is about to lose complete power shortly. Accordingly, the other network components receiving this message from the ONT 410 may then treat communications directed to the ONT 410 differently. For instance, rather than prompting a busy tone, the application server 430 may send an incoming call to an automated voicemail service, an automated announcement/alert service, a combination thereof, or other similar service.

Figure 4D:
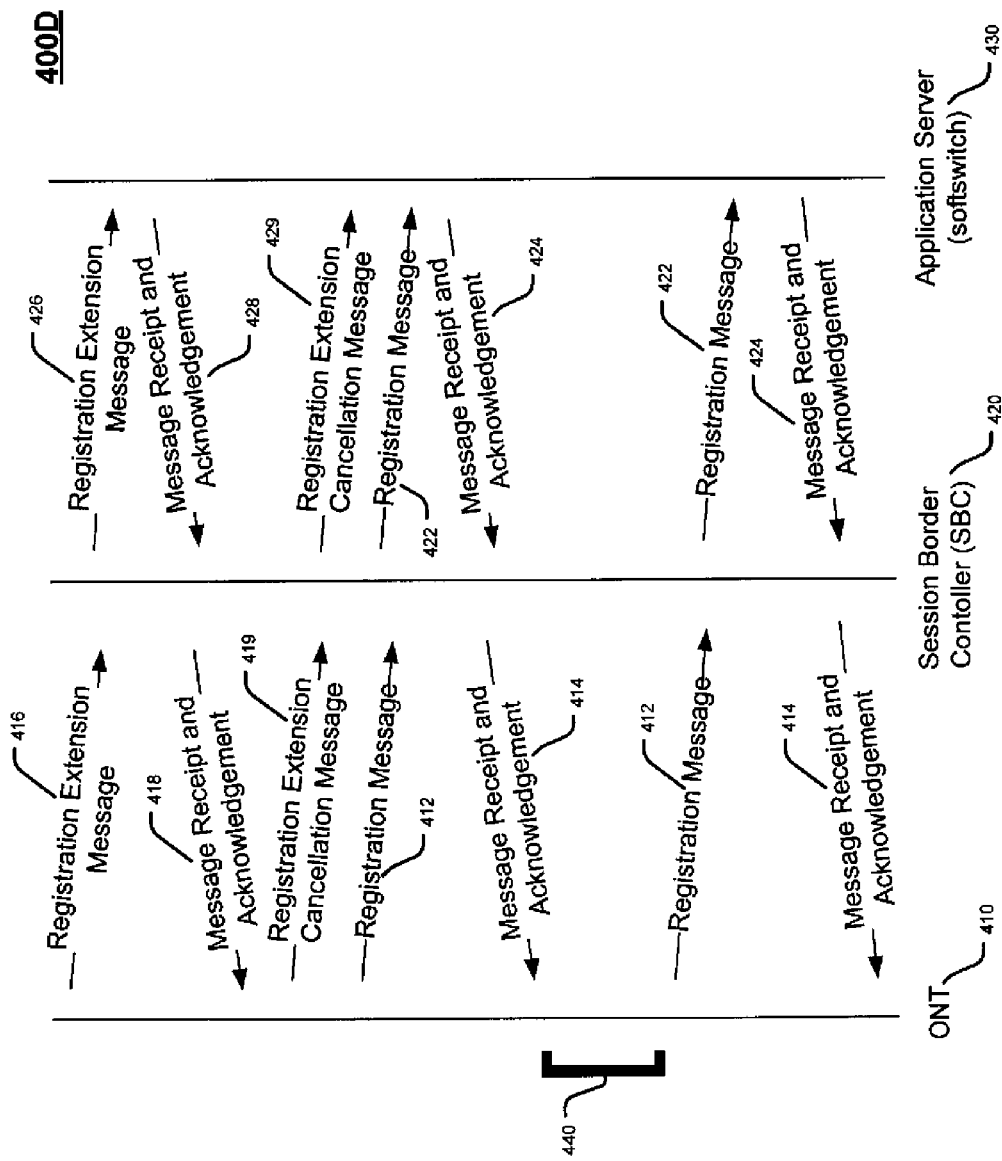

In FIG. 4D, communications 400D may be made between the ONT 410 and the other network components to restore original conditions for handling inbound communications. For example, once power is restored, the backup power may increase in capacity. Once the power reaches a second predetermined level (e.g., 10% capacity), the processor at the ONT 410 may recognize this and transmit a registration extension cancellation message 419 to the SBC 420. The SBC 420 may then transmit a registration extension cancellation message 429 to the application server 430. Once the registration extension cancellation message 429 is received by the application server 430, original conditions for handling inbound communication (e.g., before power loss) may be restored at the application server 430. Therefore, the ONT 410 may resume sending registration messages 414 at regular predetermined registration levels 440 to the SBC 420 and/or the application server 430 to remain registered.

It should be appreciated that although embodiments are described primarily with providing communications to/from the network access device 110 during power loss, the systems and methods discussed above are provided as merely exemplary and may have other applications. These may include secure communications, device tracking/registration, comprehensive network maintenance/support, hardware/software delivery, marketing and advertisement-directed services, etc.

It should also be appreciated that exemplary embodiments may support one or more additional security functions/features to provide secured communications for a number of various network components. For example, while registration is described as being implemented at the network access device 110, embodiments may be implemented at one, all, or a combination of at least the gateway 120, the application server 130, and/or other system components.

Although examples above are directed to SIP-based or packet-based networks, it should also be appreciated that other various networks or systems other than packet-based networks may utilize the techniques described above as well.

It should be appreciated that embodiments may include broadband communications of voice, data, multimedia (video, gaming, Internet Protocol Television (IPTV), Simple Messaging Service (SMS)/Multimedia Messaging Service (MMS), and/or other communicable transmissions. These may include audio, video, and/or other various signals having data/information.

It should be appreciated that while exemplary embodiments are described as being implemented over wired networks and systems, other various embodiments may also be provided. For example, registration of a network access device may be implemented over wireless networks or systems. Whether wired or wireless, the network and/or system may be a local area network (LAN), wide area network (WAN), or any other network configuration. Additionally, various communication interfaces may be used. These may include an integrated services digital network (ISDN) card or a modem to provide a data communication connection. In another embodiment, the communication interface may be a local area network (LAN) card to provide a data communication connection to a compatible LAN. Wireless links (e.g., microwave, radio, etc.) may also be implemented. In any such implementation, the communication interface may send and receive electrical, electromagnetic, and/or optical signals that carry digital data streams representing various types of information.

In one embodiment, the wireline network/system may include long-range optical data communications, local area network based protocols, wide area networks, and/or other similar applications. In another embodiment, wireless broadband connection may include long-range wireless radio, local area wireless network such as Wi-Fi (802.11xx) based protocols, wireless wide area network such as Code Division Multiple Access (CDMA)-Evolution Data Only/Optimized (EVDO), Global System for Mobile-Communications (GSM)-High Speed Packet Access (HSPA), WiMax, infrared, voice command, Bluetooth™, Long Term Evolution (LTE), and/or other similar applications. In yet another embodiment, the network with which communications are made may include the Internet or World Wide Web. Other networks may also be utilized for connecting each of the various devices, systems and/or servers.

By performing the various features and functions as discussed above, the systems and methods described above may allow registration of network components (e.g., network access device 110) even in the event of power loss, power diminishment, and/or other similar circumstance.

In the preceding specification, various embodiments have been described with reference to the accompanying drawings.

It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   identifying power loss at a network access device;
   initiating backup power at the network access device;
   identifying when the backup power at the network access device decreases to or below a first predetermined level before the backup power is depleted;
   transmitting, to a server, a registration extension message to reconfigure conditions for handling inbound communications associated with the network access device based on the identification of the backup power decreasing to or below the first predetermined level;
   identifying when backup power at the network access device is restored to or above a second predetermined level; and
   transmitting, to the server, a registration extension cancellation message to restore original conditions for handling inbound communications associated with the network access device based on the identification of the backup power being restored to or above the second predetermined level,
   wherein the original conditions for handling inbound communications include forwarding the inbound communication to the network access device and the reconfigured conditions for handling inbound communications include forwarding the inbound communications to a service capable of handling the inbound communications.

2. The method of claim 1, wherein the first predetermined level is set such that the network access device has sufficient power to transmit the registration extension message to reconfigure conditions for handling inbound communications associated with the network access device before the network access device shuts down.

3. The method of claim 1, wherein at least one of the first predetermined level and the second predetermined level are set as a capacity based on time remaining on backup power.

4. The method of claim 1, further comprising determining a level of available backup power by the network access device.

5. The method of claim 1, the transmitting involving Session Initiation Protocol (SIP).

6. The method of claim 1, wherein the network access device includes at least one of an optical network terminal (ONT) and a multi-dwelling unit (MDU) ONT.

7. The method of claim 1, further comprising transmitting one or more messages via a gateway, the gateway selectively receiving one or more messages from the network access device, selectively transmitting one or more messages to the server, selectively receiving one or more acknowledgement messages from the server, and selectively transmitting one or more acknowledgement messages to the network access device.

8. The method of claim 7, wherein the gateway is a session border controller (SBC).

9. The method of claim 1, wherein the server is at least one of an application server and a softswitch.

10. The method of claim 1, wherein the service capable of handling the inbound communications includes at least one of a voicemail service and an alert service.

11. A non-transitory computer readable medium comprising code which when executed causes a computer to perform the method of claim 1.

12. A method, comprising:
    receiving, from a network access device, a registration extension message to reconfigure conditions for handling inbound communications when the backup power at the network access device decreases to or below a first predetermined level before the backup power is depleted;
    reconfiguring, at a server, conditions for handling inbound communications based on the registration extension message;
    receiving, from the network access device, a registration extension cancellation message to restore original conditions for handling inbound communications when backup power at the network access device is restored to or above a second predetermined level, wherein the original conditions for handling inbound communications include forwarding the inbound communication to the network access device and the reconfigured conditions for handling inbound communications include forwarding the inbound communications to a service capable of handling the inbound communications; and
    restoring, at the server, conditions for handling inbound communications based on the registration extension cancellation message.

13. The method of claim 12, the transmitting involving Session Initiation Protocol (SIP).

14. The method of claim 12, wherein the first predetermined level is set such that the network access device has sufficient power to transmit the registration extension message to reconfigure conditions for handling inbound communications associated with the network access device before the network access device shuts down.

15. The method of claim 12, wherein at least one of the first predetermined level and the second predetermined level are set as a capacity based on time remaining on backup power.

16. The method of claim 12, further comprising transmitting one or more messages via a gateway, the gateway selectively receiving one or more messages from the network access device, selectively transmitting one or more messages to the application server, selectively receiving one or more acknowledgement messages from the application server, and selectively transmitting one or more acknowledgement messages to the network access device.

17. The method of claim 16, wherein the gateway is a session border controller (SBC).

18. The method of claim 12, wherein the server is at least one of an application server and a softswitch.

19. The method of claim 12, wherein the service capable of handling the inbound communications includes at least one of a voicemail service and an alert service.

20. The method of claim 12, wherein the network access device includes at least one of an optical network terminal (ONT) and a multi-dwelling unit (MDU) ONT.

21. A non-transitory computer readable medium comprising code which when executed causes a computer to perform the method of claim 12.

22. A system, comprising:
    a receiver configured to receive, from a network access device, a registration extension message to reconfigure conditions for handling inbound communications when the backup power at the network access device decreases to or below a first predetermined level before the backup power is depleted and a registration extension cancellation message to restore original conditions for handling inbound communications when backup power at the network access device is restored to or above a second predetermined level; and a processor configured to reconfigure, at a server, conditions for handling inbound communications based on receipt of the registration extension message and restore original conditions for handling inbound communications based on receipt of the registration extension cancellation message, wherein the original conditions for handling inbound communications include forwarding the inbound communication to the network access device and the reconfigured conditions for handling inbound communications include forwarding the inbound communications to a service capable of handling the inbound communications.

23. The system of claim 22, wherein the first predetermined level is set such that the network access device has sufficient power to reconfigure conditions for handling inbound communications associated with the network access device before the network access device shuts down.

24. The system of claim 22, wherein at least one of the first predetermined level and the second predetermined level are set as a capacity based on time remaining on backup power.

* * * * *